2,999,848
SULFONE POLYESTERS
Donald M. Young, Geneva, Switzerland, and Christian F. Horn, New York, N.Y., assignors to Union Carbide Corporation, a corporation of New York
No Drawing. Filed Oct. 7, 1957, Ser. No. 688,392
16 Claims. (Cl. 260—75)

This invention relates to novel polyesters and shaped articles such as filaments, films and molded products thereof, as well as to a method for their preparation.

In accordance with the invention, it has been found that polyesters having recurring structural units of the general formula (I) $\quad$ —OR''OOCRSO$_2$R'SO$_2$RCO— wherein the R's are divalent saturated alkylene radicals, R' is a divalent aralkylene radical and R'' is a divalent saturated alkylene, alkylene ether or aralkylene radical, can be prepared by reaction of alpha, omega diols containing from two to ten carbon atoms with alkylene disulfones of the general formula (II) $\quad$ R'[SO$_2$RCOOX]$_2$ in which the R's and R' are as defined in Formula I and the X's are H or lower alkyl radicals capable of forming an alcohol that has a boiling point below about 200° C.

The polyesters of the invention, and shaped articles thereof, have a considerable number of important advantages. They are crystalline, fiber-forming linear polymers having melting points within the range of about 170 to 240° C., a high degree of chemical stability, insolubility in water, dilute inorganic and organic acids, alkalies, and most organic solvents. They are capable of absorbing coloring materials and are therefore readily dyed. They possess good dielectric properties and moisture regain and are bright, tough resins that can readily be formed into fibers and films which, upon being cold-stretched, have excellent strength, resiliency and pliability.

The disulfones that are preferred as starting materials in accordance with the method of the invention are those identified in Formula II in which the R's are unsubstituted polymethylene chains containing from three to eight carbon atoms, the R's are divalent and symmetrical paradialkylene phenylene groups, and the X's are methyl groups. Disulfones of the structure described in which the R's contain only two carbon atoms are operable but not preferred because polycondensates formed therefrom lack the high thermal stability of those in which the R's contain three to eight carbon atoms. Disulfones in which the R's contain nine or more carbon atoms are also operable, but less desirable because of their tendency to depress the melting point of the polycondensate. Disulfones such as 4,4' - (para-xylylenedisulfonyl)dibutyrate, 5,5'-(para-xylylenedisulfonyl)divalerate and 6,6'-(para-xylylene - disulfonyl)dicaproate are particularly suitable. Higher alkyl diesters, i.e., in which the X's are ethyl, propyl, etc., are operable so long as the terminal alkyl radicals are capable of forming alcohols boiling below about 200° C. The corresponding acids, acid chlorides, diamides and other polymerizable derivatives are likewise operable.

The disulfones can be prepared in several ways. One method of preparation that has been found suitable involves reacting an aralkylene dichloride, R'Cl$_2$, in which the R' is as defined with reference to Formula I, with a salt of a mercapto carboxylic acid, HSRCOOH, in which the R is as defined with reference to Formula I, prepared by reacting the acid with sodium hydroxide in the presence of aqueous ethanol, to form the corresponding dithio dicarboxylic acid, oxidizing the acid thus formed with peracetic acid or other suitable oxidizing agent to convert it into the corresponding disulfonyl dicarboxylic acid and esterifying it with the appropriate alcohol. An entire sequence of reaction for forming a disulfonyl dicarboxylic acid and then esterifying it to the corresponding dimethyl ester is illustrated as follows:

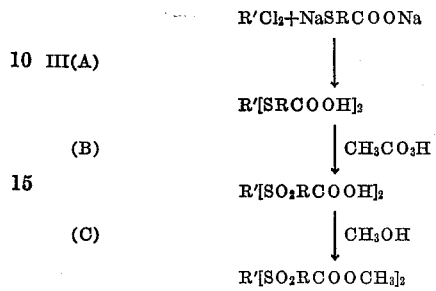

The alpha, omega diols that are suitable as starting materials in accordance with the invention include, as indicated in the definition of R'' in Formula I, dihydroxy compounds of the general formula (IV) $\quad$ R''(OH)$_2$ in which R'' is a divalent saturated alkylene, alkylene ether or aralkylene radical containing from two to ten carbon atoms. These include alpha, omega polymethylene glycols of the formula HO(CH$_2$)$_n$OH in which $n$ is an integer from 2 to 10, branched chain and alkylene ether alpha, omega glycols such as 3-methyl-1,5-pentanediol and triethylene glycol, and para-dialkylene phenylene glycols such as para-xylylene glycol and the like.

The reaction of the primary starting materials in forming substantially linear polyesters is believed to take place in essentially two stages, an ester exchange reaction and a polycondensation. While there is reason to believe that these stages are not necessarily separate and distinct and that they may at least in part take place simultaneously, the mechanism of the reactions is set forth to facilitate ready comprehension of the method involved:

(V) $\quad x$XOOCRSO$_2$R'SO$_2$RCOOX+$2x$R''(OH)$_2$

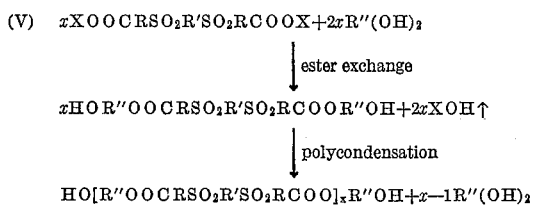

It will be evident that the ester exchange reaction involves substantially complete elimination of the X alkyl radicals in the form of the corresponding alcohol and that the polycondensation involves the elimination of excess glycol. It follows that for most effective preparation of the linear polymers, the alkyl radicals X should be lower alkyl, preferably methyl, radicals so that the resulting alcohol will have a relatively low boiling point, or at least a lower boiling point than the excess glycol eliminated in the second stage. It is also apparent that the boiling point of the glycol used as initial reactant is at least partially determinative of the conditions for polycondensation and removal of excess glycol. If a relatively low boiling glycol, e.g., ethylene glycol, is used, it can be used in considerable excess because a substantial amount can be distilled without in the least degrading the polymer through thermal decomposition. If, however, a higher boiling glycol such as 1,10-decanediol is used, it is desirable to use a smaller excess.

The initial reactants are admixed, preferably with a catalyst, and subjected to conditions producing ester interchange until the ester interchange is substantially complete. These conditions involve heating the reactants to a temperature sufficiently high to bring about the reaction and to eliminate the alcohol formed thereby. Temperatures of the order of about 150 to 250° C. are ordinarily sufficient to initiate and complete the ester interchange. For polycondensation and elimination of the glycol, the temperature employed is above the melting point of the polymer, below the temperature at which the polymer becomes thermally unstable and above the boiling point of the glycol under the pressure conditions of operation. As a rule, this temperature of polycondensation is advantageously about 8 to 30° C. above the melting point of the polymer. If the boiling point of the glycol to be eliminated is substantially higher than this temperature, the polycondensation can be carried out under reduced pressure so as to assure complete removal of excess glycol from the melt. Polycondensation temperatures within the range of 180 to 285° C. and preferably between about 210 and 280° C. lead to uniformly good results although departures from these temperatures, i.e., as high as 300° C., may be permissible if some discoloration and degradation is not considered unduly detrimental.

The reactions should be carried out under an inert atmosphere such as nitrogen and may proceed at atmospheric, reduced, or superatmospheric pressure. In the preferred embodiment of the method of the invention, a stream of nitrogen is passed through the melt so as to provide an inert atmosphere and at the same time agitate the reactants to assist in removing the alcohol or glycol distilled from the reaction mixture. When glycols are used that boil at temperatures too high for easy elimination at atmospheric pressure and at temperatures unduly close to or above the temperature of thermal degradation of the monomers or polymers, it is desirable to sweep excess glycols out of the melt with an inert gas such as nitrogen, or to operate under reduced pressure as indicated earlier, or to use a combination of these measures.

The reaction may also be carried out by means of the solution polymerization technique that involves dissolving the starting materials in an inert solvent such as a paraffin oil or other high boiling aliphatic or aromatic hydrocarbon containing no reactive groups, followed by heating at elevated temperatures under a nitrogen atmosphere until the desired degree of polymerization has been reached or the molecular weight of the product is high enough to precipitate from the hot solution.

In starting with a glycol and a disulfone diester, ester interchange catalysts are preferably used. These include such well known catalysts as metallic lithium, sodium, potassium, calcium, beryllium, magnesium, zinc, cadmium, aluminum, chromium, manganese, iron, cobalt, nickel, silver, mercury, tin, lead, bismuth, antimony, platinum and rhodium. The alcoholates, oxides and salts of many of these metals with weak inorganic and organic acids are also useful as catalysts in the ester interchange and polymerization reaction. In addition, titanium alkoxides, organotin compounds, alkali hydrides, and the like, are suitable as catalysts for the polymerization. If the disulfone diacids, i.e., where X=H, are used, it is preferable to employ either no catalyst or small amounts of catalysts such as para-toluenesulfonic acid, zinc chloride, boron trioxide, camphor-sulfonic acid, or the like.

The amount of catalyst used is preferably within the range of about 0.005 to about 0.5 and preferably between about 0.05 and 0.25% based on the total amount of disulfone that is used. Departures from these ranges are permissible. However, the use of more than about 0.5% may result in discoloration of the ultimate polymer and amounts less than about 0.005% will reduce the rate of reaction to an extent that would not be practicable for commercial operation.

The molar proportion of glycol used in the reaction should, as indicated in Equation V, at least equal and preferably be at least twice the molar amount of disulfone. When a readily removable glycol such as ethylene glycol is used, there is some advantage in using a higher proportion of glycol, e.g., up to about ten mols per mol of disulfone, inasmuch as the glycol will tend to act as a solvent for the catalyst and to assure complete ester exchange. With higher boiling alcohols, however, it is advantageous to use less excess.

It is to be understood, of course, that mixtures of disulfones and mixtures of diols may be employed in order to form copolymers in which the different disulfone and glycol residues are present in ordered or random distribution. The polymers so produced are generally somewhat less crystalline, lower melting and softer than those obtained by using a specific disulfone and a specific glycol.

It is also within the scope of the invention, as will readily be appreciated by those skilled in the art, to start with the saturated glycolic diesters of the disulfones and simply subject them to homopolymerization or to start with two or more such glycolic diesters and subject them to copolymerization, thus avoiding the initial ester interchange reaction of disulfone with glycol.

The method, products and the utility and advantages thereof will become further apparent from the following detailed examples included to illustrate the best modes now contemplated of practicing the invention. In these examples the parts are by weight and the reduced viscosity, used as a measure of the degree of polymerization, is defined by Equation VI:

$$(VI) \qquad I_R = \frac{\left(\frac{\Delta N}{N_0}\right)}{C}$$

in which $\Delta N$ is the difference between flow time of solution and flow time of solvent, $N_0$ stands for flow time of solvent and C is the concentration of the polymer in grams per 100 cc. of solution. Unless otherwise specified, reduced viscosity values were obtained at 47° C., the solvent was a 3:2 mixture of phenol and tetrachloroethane and the concentration of the polymer in the solution was 0.2 gram/100 cc.

*Example 1*

Dimethyl 4,4'-(para-xylylenedisulfonyl)dibutyrate (10 parts) and ethylene glycol (10 parts), with antimony trioxide (0.003 part) and magnesium acetate (0.013 part) as catalysts, were charged into a vessel suitable for operation at pressures slightly above atmospheric pressure and equipped with an agitator and a diffuser at the bottom for introduction of nitrogen. The ester exchange reaction was carried out at 195° C. with continuous removal of methanol by forcing a slow stream of nitrogen through the melt. After termination of the methanol distillation, polycondensation was effected at 250° C. for 7.8 hours while purging a vigorous stream of nitrogen through the reaction mixture.

The resulting polymer was a fiber-forming and cold-drawing resin of high molecular weight having a reduced viscosity of 0.73. Its melting point was 234 to 235° C.

*Example 2*

The general procedure of Example 1 was repeated except that 10 parts dimethyl 4,4'-(para-xylylenedisulfonyl) dibutyrate, 10 parts 1,4-butanediol and 0.016 part magnesium acetate were charged to the condensation vessel. The ester exchange was conducted at 190° C. over a period of one hour. The polycondensation was then carried out at 235° C. for 9.5 hours.

The resin obtained had a reduced viscosity of 0.48 and melted at 219° C. It was white in color and fibers of this resin could be cold-stretched close to 550% and showed excellent resiliency, dyeability and other desirable textile properties. The excellent ability of fibers of this resin to recover from stretching at a rate of 10% per mintite is demonstrated by the results, tabulated below, of comparative tests with polyethylene terephthalate (PET):

| Stretch, percent | Immediate recovery, percent of total stretch | |
|---|---|---|
| | Filaments of Example 2 | Filaments of PET |
| 1 | 90 | 92 |
| 2 | 74 | 61 |
| 3 | 64 | 46 |
| 5 | 49 | 38 |
| 10 | 29 | 20 |

Recovery of the filaments of Example 2 from stretches as high as 10% was substantially complete after five minutes.

Example 3

Dimethyl 4,4'-(para-xylylenedisulfonyl)dibutyrate (10 parts), 1,5-pentanediol (10 parts) and 0.16 part magnesium acetate were heated in a condensation vessel to 180° C. to bring about an initial ester exchange. The removal of methanol was assisted by a stream of nitrogen forced through the melt. After the ester exchange was finished the temperature of the reaction mixture was increased to 230 to 235° C. and the polycondensation was carried out at 4–1 mm. pressure over a period of 10.5 hours.

The polymer could be extruded to cold-stretchable and strong fibers which had a melting point of 200° C. The reduced viscosity of the resin was 0.71.

Example 4

The general procedure of Example 3 was repeated except that 10 parts dimethyl 4,4'-(para-xylylenedisulfonyl)dibutyrate, 10 parts 1,6-hexanediol, 0.016 part magnesium acetate and 0.004 part dibutyltin oxide were charged to the polycondensation vessel. The ester-exchange reaction was conducted at 195° C. over a period of 1.5 hours. Thereafter, the reaction melt was subjected to the polymerization cycle at 230° C. and at a pressure of 3–1 mm. for eight hours.

The final resin was light amber, melted at 196.5° C., and was found to have a reduced viscosity of 0.65. The polymer was fiber-forming and of excellent cold-stretchability.

Example 5

Dimethyl 4,4' - (para - xylylenedisulfonyl)dibutyrate (150 parts), 1,4-butanediol (150 parts), dibutyltin oxide (0.045 part) and tetraisopropyl titanate (0.0675 part) were heated to 200° C. in nitrogen atmosphere to bring about the ester exchange. Thereafter, the temperature was raised to 235° C. and the polycondensation was performed for eight hours while passing a stream of nitrogen (5 liters/min.) through the melt.

The resulting resin was bright and showed excellent fiber-forming and cold-drawing properties. The reduced viscosity was 1.09, the melting point 212 to 215° C.

The polymer was melt-spun by a plunger-type extrusion machine at 240° C. using a 30 hole 0.015" spinneret. The filaments formed were drawn over a hot-pin at 80° C. to an extent of 235% into 206 denier filaments. The following physical data were obtained on these filaments:

Tenacity, g.p.d _____ 2.2
Shrinkage (in percent):
    At 100° C _____ 7.5
    At 150° C _____ 6.5
Dye affinity $E_{AB}$[1] _____ 54.3

[1] $E_{AB}$ = percentage of dye in the dyebath that is absorbed by the fiber.

Besides being superior to other polymer fibers in dyeability, the filaments of this resin are also characterized by resilience which is even better than that of polyethylene terephthalate, as shown in the table:

| Immediate recovery from— | 1% | 5% | 7% | Stretch |
|---|---|---|---|---|
| Sulfone polymer | 95 | 84 | 64 | (¹) |
| Polyethylene terephthalate | 91 | 65 | 47 | (¹) |

¹ At a rate of 50% per minute.

The ultimate recovery of the sulfone polymer was particularly striking. Complete recovery from stretches as high as 10% took place within five minutes, and indications were that most of the recovery took place within the first minute. Polyethylene terephthalate, however, showed about 20% set (i.e., 2% residual deformation) five minutes after being stretched 10%.

Example 6

Dimethyl 5,5'-(para-xylylenedisulfonyl)divalerate (100 parts), ethylene glycol (100 parts), magnesium acetate (0.12 part) and tetraisopropyl titanate (0.05 part) were heated in a polycondensation vessel at 185 to 190° C. for two hours to bring about the initial ester exchange. The removal of the methanol was assisted by a stream of nitrogen which was passed through the melt. Thereafter, the temperature was raised to 220° C. to distill out ethylene glycol excess. The actual polymerization was performed at 235° C. over a period of eight hours at atmospheric pressure while passing nitrogen through the melt.

The resulting resin had a reduced viscosity of 0.72 at 30° C. and melted at 212 to 214° C. The polymer was melt-spun by a plunger-type extrusion machine at 250° C. using a 30-hole 0.015" spinneret. The filaments formed were drawn over a hot-pin at 85° C. to an extent of 353% into strong 155 denier filaments. The following physical properties were obtained:

Tenacity, g.p.d _____ 2.7
Shrinkage (in percent):
    At 100° C _____ 6.5
    At 150° C _____ 5.5
Dye affinity, $E_{AB}$ _____ 47.5

The most outstanding properties of this material as compared to known polyesters is the greatly improved dyeaffinity and resiliency. Whereas polyethylene terephthalate has an $E_{AB}$ of approximately 34, this fiber was found to have an $E_{AB}$ value of 47.5. The dyeability studies were performed at 100° C. (two hours) using Eastone Fast Red GLF, a dispersed acetate dye. Neither carriers nor swelling agents were employed in the dyeing process.

Example 7

Dimethyl 5,5' - (para - xylylenedisulfonyl)divalerate (100 parts), 1,4-butanediol (100 parts), magnesium acetate (0.12 part) and tetraisopropyl titanate (0.05 part) were heated at 195° C. for 1.5 hours in nitrogen atmosphere to bring about the ester exchange. Thereafter, the excess of butanediol was distilled out at 230° C. and the polymerization performed over a period of eight hours at the same temperature. A fast stream of 5 liters/min. nitrogen was passed through the melt to remove the glycol formed during the polymerization.

The final resin was light ivory and appeared to be very tough. The reduced viscosity was 1.30 at 30° C. The melting point was 203 to 205° C.

The polymer was melt-spun as described in Example 6 and the following textile properties were obtained:

Denier _____ 198
Tenacity, g.p.d _____ 2.8
Elongation, percent _____ 11.9
Shrinkage (in percent):
    At 100° C _____ 9.0
    At 150° C _____ 8.0
Dye affinity, $E_{AB}$ _____ 64.3

Example 8

Ten parts dimethyl 5,5'-(para-xylylenedisulfonyl)divalerate were reacted in each of three test runs with 10 parts of a different glycol in the presence of 0.012 part magnesium acetate and 0.005 part tetraisopropyl titanate in the manner described in the previous examples. The identity of the glycol, the ester exchange and polycondensation conditions and the reduced viscosities at 30° and melting points of the resulting polycondensates were as summarized in the table below:

| Diol | Ester exchange | | Polycondensation | | Reduced viscosity | Melting point |
|---|---|---|---|---|---|---|
| | Time, hr. | Temp., °C. | Time, hr. | Temp., °C. | | |
| $C_5$ | 0.7 | 185 | 4.3 | 210 | 1.20 | 191–3 |
| $C_6$ | 0.3 | 200 | 4.3 | 220 | 1.16 | 190–2 |
| $C_{10}$ | 0.3 | 200 | 4.3 | 230 | 0.94 | 182–3.5 |

All polymers have excellent fiber-forming and cold-drawing properties and are crystalline.

Example 9

Dimethyl 6,6' - (para-xylylenedisulfonyl)dihexanoate (10 parts), ethylene glycol (5 parts), zinc borate (0.006 part) and calcium (0.003 part) were charged to a glass condensation vessel, equipped at the bottom with a sintered glass gas diffusion plate. The mixture was heated to 180° C. for 1.5 hours while passing a gentle stream of nitrogen through the melt which facilitated the removal of methanol formed during the ester exchange reaction. After the theoretical amount of methanol was distilled out, the temperature was slowly raised to 245° C. to perform the polycondensation reaction over a period of fourteen hours until the resin showed fiber-forming properties.

The polymer obtained had a melting point of 198 to 200° C. and a reduced viscosity of 0.8.

Example 10

The general procedure of Example 1 was repeated except that 10 parts of dimethyl 6,6'-(para-xylylenedisulfonyl)dihexanoate, 10 parts ethylene glycol, and 0.016 part magnesium acetate were employed in the polycondensation. After the termination of the ester exchange, the melt was heated to 230° C. over a period of 15.5 hours.

The resin, thus prepared, was white and could be readily melt-spun into continuous filaments having excellent dyeability, resiliency, and other desirable properties. The melting point of the resin was 196° C., its reduced viscosity 0.96.

Example 11

The general procedure of Example 3 was repeated except that 30 parts dimethyl 6,6'-(para-xylylenedisulfonyl)dihexanoate, 10 parts 1,4-butanediol, and 0.3 part calcium were employed in the condensation. The ester exchange was conducted at 190° C. over a peirod of 2.5 hours. Thereafter, the temperature was raised to 230° C. and the polycondensation was carried out under reduced pressure (5–1 mm.) over a period of 17.5 hours in a nitrogen atmosphere.

The resin obtained had a reduced viscosity of 0.77 and melted at 190° C. Its fiber-forming and cold-drawing properties were excellent.

Example 12

The general procedure of Example 3 was repeated except that 20 parts dimethyl 6,6'-(para-xylylenedisulfonyl)dihexanoate, 20 parts 1,10-decanediol, 0.02 part calcium and 0.04 part zinc borate were heated in a condensation vessel at 200° C. to bring about the ester exchange. After the methanol distillation was finished the temperature of the reaction mixture was increased to 225° C. and the polycondensation reaction was performed under reduced pressure (2 mm.) over a period of eleven hours in a nitrogen atmosphere.

A bright resin, having a reduced viscosity of 0.78 and a melting point of 172 to 174° C. was obtained which showed good usefulness in molding, coating and film applications.

Example 13

Dimethyl 6,6' - (para - xylylenedisulfonyl)dihexanoate (134 parts), ethylene glycol (134 parts), magnesium acetate (0.08 part) and calcium (0.121 part) were heated for 2.7 hours to 185° C. in nitrogen atmosphere to bring about ester exchange. Excess glycol was removed at 210° C. and polymerization was performed at 230 to 235° C. over a period of 9.7 hours while passing a fast stream of nitrogen (5 liters/min.) through the melt.

The polymer obtained was almost white and melted at 192 to 194° C., its reduced viscosity was 0.84 at 30° C.

The polymer was melt-spun by a plunger-type extrusion machine at 215° C. using a 30-hole 0.015" spinneret. The filaments formed were drawn over a hot-pin at 75° C. to an extent of 317% into 206 denier filaments. The following physical propertiese were obtained:

Tenacity, g.p.d. _____ 1.9
Shrinkage (in percent):
    At 100° C. _____ 6.0
    At 150° C. _____ 5.0
Dye affinity, $E_{AB}$ _____ 63.2

The combination of low tenacity and low shrinkage of these filaments is very desirable for staple fibers.

It is to be expected that numerous modifications will readily become apparent to those skilled in the art upon reading this description. All such modifications are intended to be included within the scope of the invention as defined in the appended claims.

We claim:

1. A fiber-forming linear polymer consisting essentially of structural units of the general formula

—OR''OOCRSO$_2$R'SO$_2$RCO— wherein the R's are divalent saturated alkylene radicals containing from three to eight carbon atoms, R' is a para-dialkylene phenylene radical containing up to ten carbon atoms and R'' is a divalent radical selected from the group consisting of saturated alkylene, alkylene ether and aralkylene radicals containing from two to ten carbon atoms.

2. Method which comprises heating a mixture consisting essentially of a disulfone of the general formula

R'[SO$_2$RCOOX]$_2$ wherein the R's are divalent saturated alkylene radicals containing from three to eight carbon atoms, R' is a para-dialkylene phenylene radical containing up to ten carbon atoms, and the X's stand for members selected from the group consisting of hydrogen and lower alkyl radicals of alcohols having boiling points below about 200° C., with an alpha,omega diol having the general formula

R''(OH)$_2$ wherein R'' is a divalent radical selected from the group consisting of saturated alkylene, alkylene ether and aralkylene radicals containing from two to ten carbon atoms to obtain a fiber-forming melt.

3. Method which comprises heating a mixture consisting essentially of a disulfone of the general formula

R'[SO$_2$RCOOX]$_2$ wherein the R's are divalent saturated alkylene radicals containing from three to eight carbon atoms, R' is a para-dialkylene phenylene radical containing up to ten carbon atoms and the X"s stand for members selected from the group consisting of hydrogen and lower alkyl radicals of alcohols having boiling points below about 200° C., with an alpha,omega diol having the general formula $$R''(OH)_2$$

wherein R" is a divalent radical selected from the group consisting of saturated alkylene, alkylene ether and aralkylene radicals containing from two to ten carbon atoms to a temperature of the order of about 150 to 250° C. to effect ester interchange and heating the reaction mixture to a temperature within the range of about 180 to 285° C. to obtain a fiber-forming melt.

4. Method which comprises heating a mixture consisting essentially of a disulfone of the general formula $$R'[SO_2RCOOX]_2$$

wherein the R's are divalent saturated alkylene radicals containing from three to eight carbon atoms, R' is a para-dialkylene phenylene radical containing up to ten carbon atoms and the X"s stand for members selected from the group consisting of hydrogen and lower alkyl radicals of alcohols having boiling points below about 200° C., with an alpha,omega diol having the general formula $$R''(OH)_2$$

wherein R" is a divalent radical selected from the group consisting of saturated alkylene, alkylene ether and aralkylene radicals containing from two to ten carbon atoms to a temperature of the order of about 150 to 250° C. to effect ester interchange, heating the reaction mixture to a temperature within the range of about 180 to 285° C. to obtain a fiber-forming melt and melt-spinning the resulting resin into filament form.

5. A fiber-forming linear polymer consisting essentially of repeating structural units of the formula

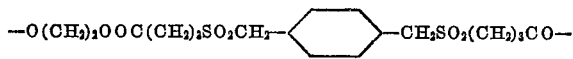

6. A fiber-forming linear polymer consisting essentially of repeating structural units of the formula

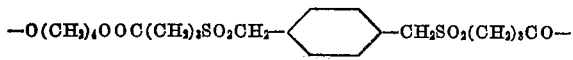

7. A fiber-forming linear polymer consisting essentially of repeating structural units of the formula

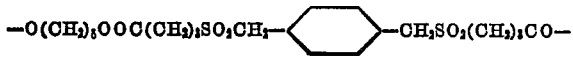

8. A fiber-forming linear polymer consisting essentially of repeating structural units of the formula

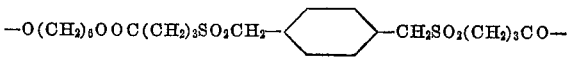

9. A fiber-forming linear polymer consisting essentially of repeating structural units of the formula

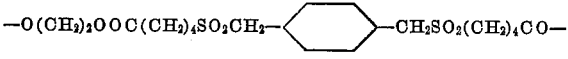

10. A fiber-forming linear polymer consisting essentially of repeating structural units of the formula

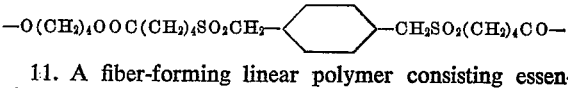

11. A fiber-forming linear polymer consisting essentially of repeating structural units of the formula

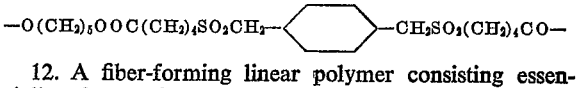

12. A fiber-forming linear polymer consisting essentially of repeating structural units of the formula

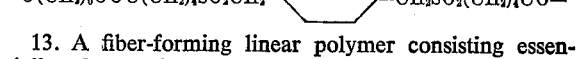

13. A fiber-forming linear polymer consisting essentially of repeating structural units of the formula

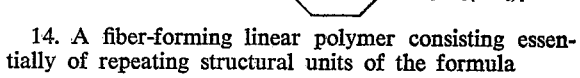

14. A fiber-forming linear polymer consisting essentially of repeating structural units of the formula

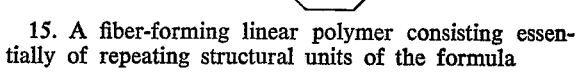

15. A fiber-forming linear polymer consisting essentially of repeating structural units of the formula

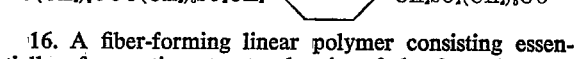

16. A fiber-forming linear polymer consisting essentially of repeating structural units of the formula

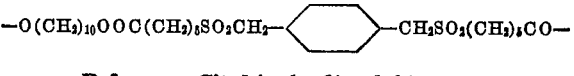

References Cited in the file of this patent
UNITED STATES PATENTS

| | | |
|---|---|---|
| 2,427,640 | Whitehill et al. | Sept. 16, 1947 |
| 2,614,120 | Caldwell | Oct. 14, 1952 |
| 2,720,502 | Caldwell | Oct. 11, 1955 |